July 29, 1969　　M. BOWERMAN　　3,457,809
SAW BLADE GRINDER

Filed June 15, 1967　　3 Sheets-Sheet 1

Martin Bowerman
INVENTOR.

BY

July 29, 1969  M. BOWERMAN  3,457,809
SAW BLADE GRINDER

Filed June 15, 1967  3 Sheets-Sheet 2

Martin Bowerman
INVENTOR.

July 29, 1969  M. BOWERMAN  3,457,809
SAW BLADE GRINDER

Filed June 15, 1967 3 Sheets-Sheet 3

Martin Bowerman
INVENTOR.

BY
Attorneys

United States Patent Office 3,457,809
Patented July 29, 1969

3,457,809
SAW BLADE GRINDER
Martin Bowerman, Grand Rapids, Mich., assignor to Martin Engineering Company, Grand Rapids, Mich.
Filed June 15, 1967, Ser. No. 646,411
Int. Cl. B23d 63/14; B24b 3/00
U.S. Cl. 76—40          15 Claims

ABSTRACT OF THE DISCLOSURE

A machine for sharpening the teeth of all types of circular saws including a mounting base which pivotally mounts a platform having an adjustable motor driven grinding head thereon for selective grinding engagement with a pawl located saw blade mounted for sequential advancement in order to present all of the teeth thereof to the grinding wheel.

---

The instant invention is generally concerned with saw blade sharpening or grinding, and more particularly relates to a machine for mounting and power driving a grinding wheel in conjunction with means for adjustably mounting a saw blade for selective engagement by the grinding wheel.

It is a primary object of the instant invention to provide a grinder or grinding machine which is capable of effectively accommodating all types of circular saws, as well as saws of a wide range of sizes.

In conjunction with the above object, it is also a significant object of the instant invention to provide a saw blade sharpening machine which is lightweight, compact and substantially portable in nature, being in effect a self-contained unit.

Another significant object of the instant invention resides in the provision of means whereby the grinding wheel itself can be adjustably positioned so as to accommodate a wide range of different size blades, and likewise produce the desired bevel thereon.

Furthermore, it is an object of the instant invention to provide a grinding machine wherein the grinding wheel itself can be vertically, horizontally and rotatably adjusted so as to achieve the particular grinding orientation desired.

Basically, the machine of the instant invention includes a base, a platform mounted on said base for vertical pivoting adjustment thereto, a tool post laterally and rotatably adjustable on the platform, and a grinding unit, including a driving motor, mounted for vertical pivoting on the tool post within adjustable ranges. The platform itself additionally has a blade mounting unit adjustably affixed thereto so as to position the blade for engagement of the grinding wheel sequentially with the teeth thereabout.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
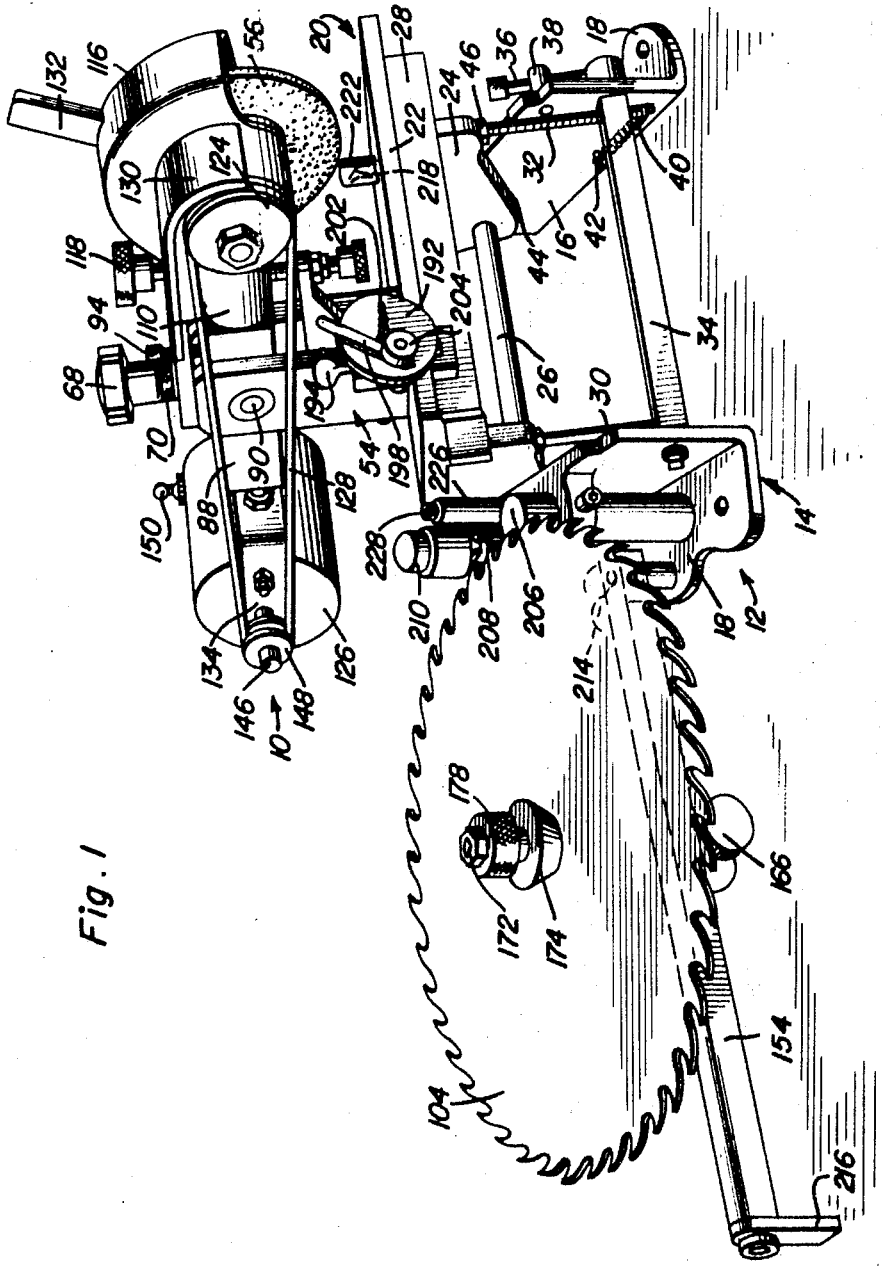
FIGURE 1 is a perspective view of the machine comprising the instant invention with the blade mount being positioned for effecting a setting of the teeth.

Referring now more specifically to the drawings, reference numeral 10 is used to generally designate the grinder or saw sharpening machine comprising the instant invention.

Figure 2:
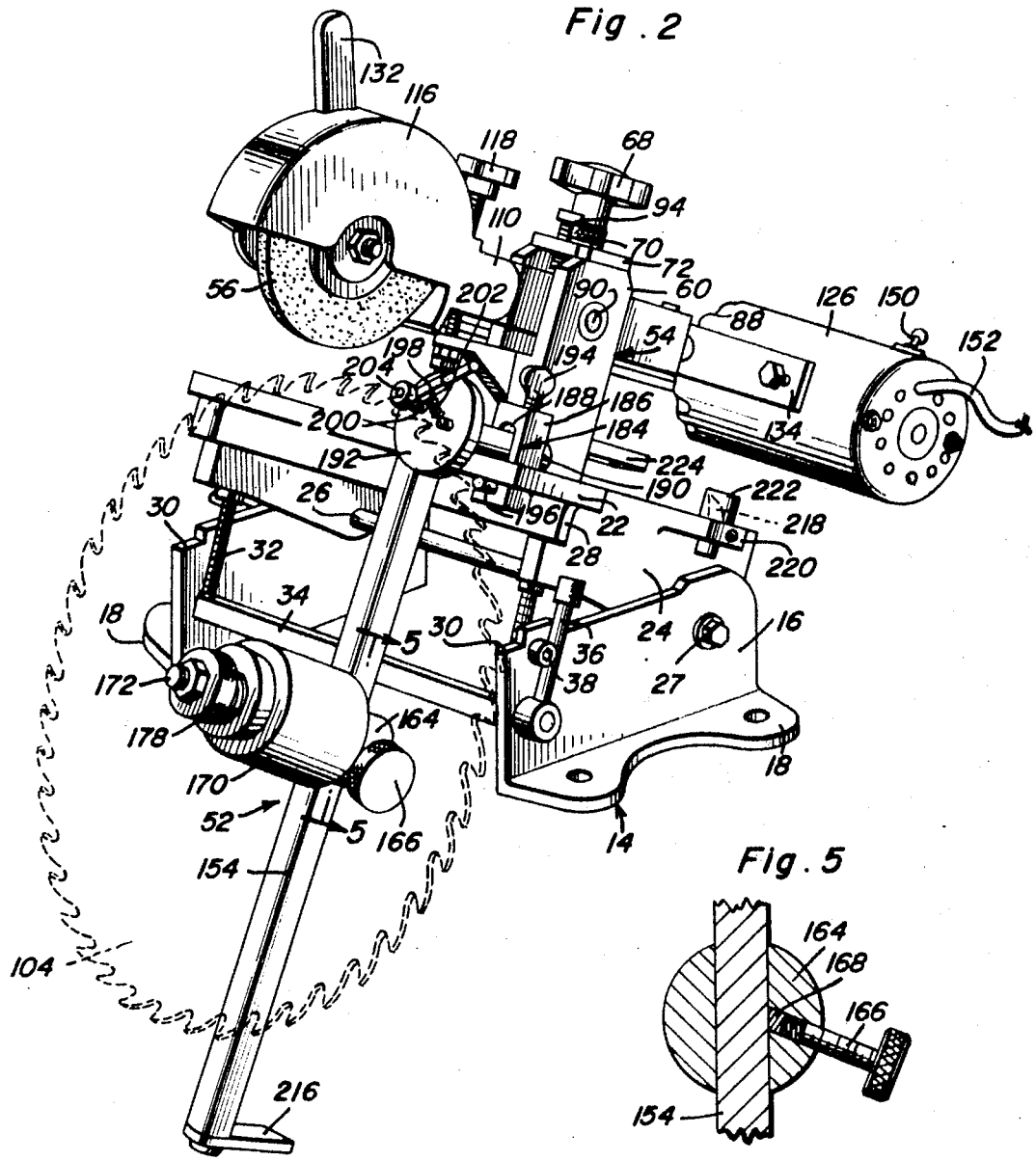
FIGURE 2 is perspective view of the machine with the blade mount in operative position for effecting a sharpening of the blade teeth.
Figure 3:
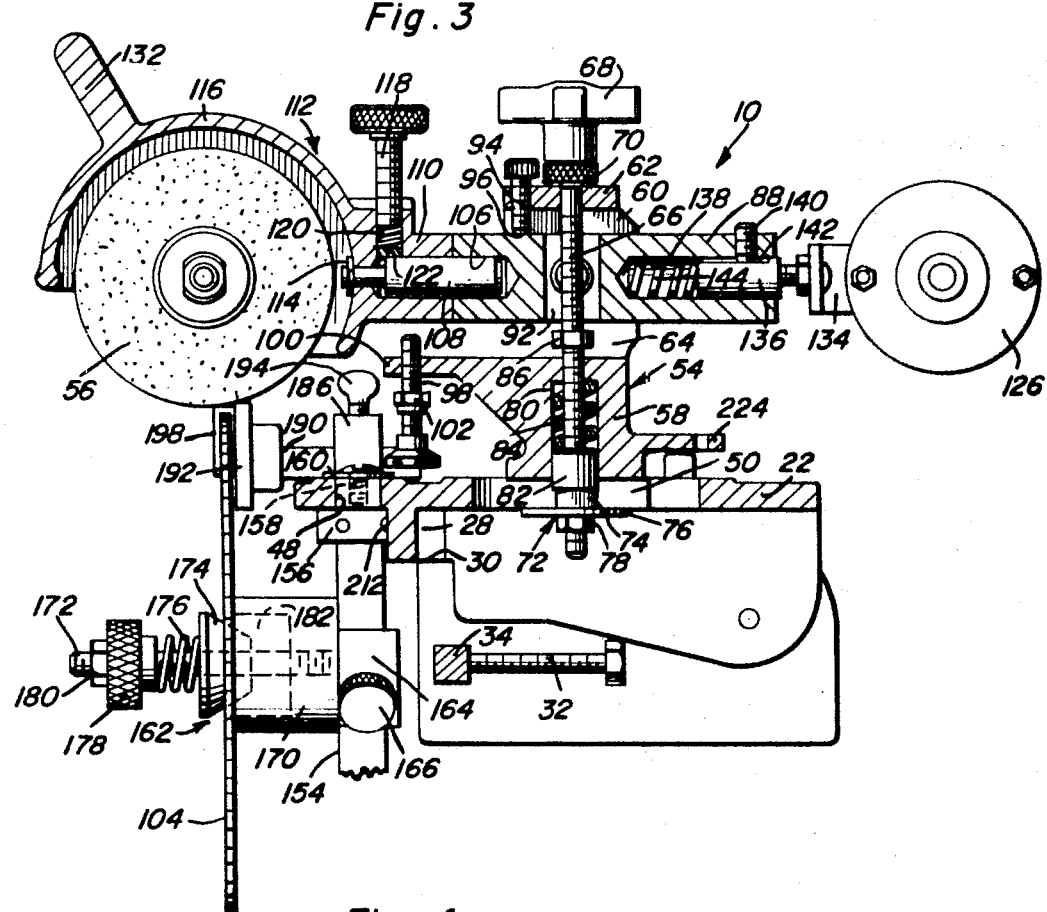
FIGURE 3 is an enlarged transverse cross-sectional view through the machine.

The machine 10 includes a mounting base 12 comprising a pair of laterally spaced base elements 14, each including a vertical wall 16 and a lateral outwardly directed flange 18 which forms a foot for clamping, bolting or otherwise securing the base 12 to a table or bench top. A tool mounting platform unit 20 is mounted for vertical pivoting between the laterally spaced parallel base walls 16 and includes, in addition to the top plate or platform 22 itself, opposed depending side wall 24 which are positioned immediately inward of the corresponding base walls 16. The actual hinging of the platform unit 20 to the base 12 is effected at the rear thereof by suitable pivot means, such as a shouldered shaft 26, journaled within the opposed pairs of walls 24 and 16, each end of the shaft 26 having a suitable retaining head 27 or the like thereon engaged with the outer faces of the base walls 16. The platform unit 20 is mounted for vertical pivoting adjustment between a horizontal position and an upwardly inclined position of approximately 25° from the horizontal. An elongated bearing bar 28 is affixed to the forward edges of the platform walls 24 immediately beneath the forward edge portion of the platform 22 and projects laterally beyond both platform walls 24 for bearing engagement with a pair of recessed seats 30 provided in the upper edges of the opposed base walls 16 adjacent the forward edge thereof, thereby orientating the platform unit 20 horizontally relative to the base 12. The upwardly angled position of the platform unit 20, illustrated in FIGURES 1 and 2, is effected by the provision of a pair of support arms 32 which are affixed to an elongated bar 34 extending between and rotatably mounted by the base walls 16 adjacent the forward edge thereof. The rotation of the bar 34 is effected through a laterally directed control handle 36 affixed to one end of the bar 34 immediately outward one of the base walls 16. In effecting a movement of the platform unit 20 from the horizontal position of FIGURE 3 to the upwardly angled position of FIGURE 1, the handle 36 is manipulated so as to rotate the bar 34 and swing the support arms 32 upwardly to a position limited by a stop 38 affixed to the base wall 16 in rotational alignment with the handle 36. Further, the support arms 32 are maintained in an elevated position by a resilient tension spring 40 engaged between the lower end of one of the support arms 32 below the rotating bar 34 and a fixed pin 42 rearward of the bar 34 and rigid with the adjoining base wall 16 as will be best appreciated from FIGURE 1. It is contemplated that the bottom edge 44 of each of the depending platform walls 24 be in the nature of an upwardly inclined cam following surface terminating in a forward flat seat against which the enlarged head 46 of the corresponding support arm 32 engages whereby a rapid positioning of the platform unit 20 can be effected through a rotation of the handle 36. If necessary, it will of course be appreciated that the platform unit 20 can be manually raised and the support arms subsequently positioned. Further, should it be deemed desirable, the support arms 32 can be in the nature of elongated threaded rods adjustably threaded through the rotatably mounted bar 34 whereby the effective length thereof can be adjusted, this in turn adjusting the upwardly angle position of the plaform unit 20.

Figure 4:
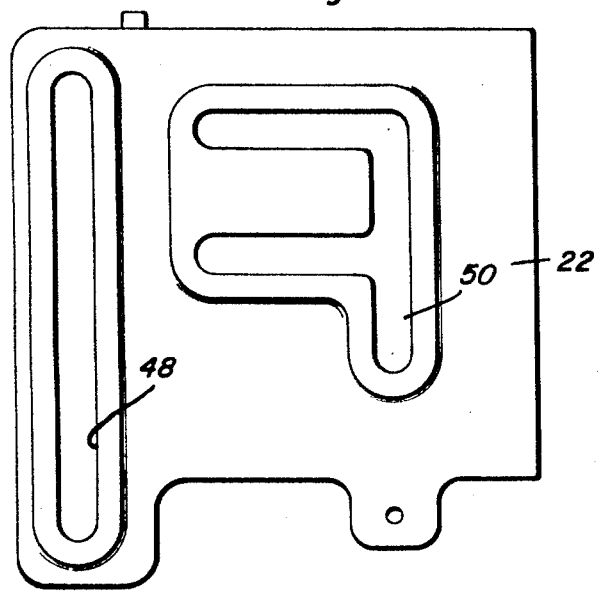
FIGURE 4 is a top plan view of the tool mounting platform.

With reference to FIGURE 4, it will be noted that the platform or top plate 22 is provided with two elongated adjusting slots 48 and 50 therethrough. The slot 48 extends transversely across the forward portion of the plate 22 for substantially the full width of the plate for an adjustable positioning of the blade mount 52. The slot 50 consists of a main portion paralleling the slot 48 rearwardly thereof and two lateral extension portions extending forwardly from the main portion in transversely spaced relation to each other, the three portions of the slot 50 being orientated centrally within the plate 22 and being utilized in varying the location of the tool post 54 so as to vary the orientation of the grinding wheel 56 itself whereby variations in the bevel, etc. can be effected as desired.

The tool post 54 comprises a lower block portion 58 having a pair of upwardly projecting integral laterally spaced panels 60 and a horizontal top panel 62 spanning and rigidly interconnecting the side panels 60 so as to define in effect a front to rear open chamber or passage 64 completely through the pedestal 54. A vertically extending threaded lock rod 66 extends freely vertically through the pedestal 54, the top panel 62 and the block 58 being apertured so as to accommodate the lock rod 66 rotatably therethrough. The upper end of the lock rod 66, above the top panel 62 is provided with a rod controlling hand knob 68 and a vertically adjustable setscrew locked collar 70 between the knob and the top panel 62 for bearing engagement thereagainst. The lower portion of the lock rod 66 is provided with a post gliding and clamping unit 72 which consists of a square nut 74 threaded on the rod 66 and received within the slot 50, a flat washer or plate 76 secured to the nut 74 and underlying the platform 22, and a second nut 78 rigidly affixed to the washer 76 immediately therebelow and also threaded on the rod 66. The nut 74 has a transverse dimension between the opposed flat faces thereof such as to enable a free sliding of this nut throughout the adjustment slot 50, this nut 74 of course also being negotiable about the corners between the slot portions. However, the transverse dimension of the nut 74 between the opposed corners thereon is greater than the width of the slot 50 whereby the nut 74 will be prevented from rotation with the lock rod 66 and in effect moved longitudinally along the lock rod 66 in response to a rotation thereof through the hand knob 68 either downwardly so as to move the clamping washer 76 away from the plate or platform 22 or upwardly so as to effectively engage the washer 76 with the undersurface of the platform 22 and the lock collar 70 with the top panel 62 in order to produce a positive clamping of the tool post 54 to the platform 22 in an adjusted position.

The lower block-like portion 58 of the tool post 54, immediately above the square or rectangular nut 74 is provided with a downwardly directed enlarged cylindrical chamber 80 within which is received a bolt surrounding cylindrical spacer 82 resting directly on the nut 74, and an expanded coil compression spring 84 resiliently bearing between the upper end of the chamber 80 and the top of the spacer 82 whereby a constant downward urging of the lock rod 66 is effected. This in turn facilitates the release of the tool post 54 for an adjustment thereof, and when released, tends to maintain the clamping washer 76 in a released position to facilitate an adjustment of the tool post 54. Finally, an adjustable jamnut 86 is provided on the lock rod 66 within the front to rear passage or chamber 64 toward the bottom thereof so as to act in the manner of a limit to the vertical movement of the rod 66 so as to, as an example, prevent a movement of the nut 74 out of the slot 50.

Extending longitudinally through the tool post passage 64 from front to rear is an elongated tool arm 88. This arm 88 is pivotally mounted to the opposed vertical tool post panels 64 by suitable pivot pins 90 and includes an enlarged vertical passage 92 completely therethrough for the accommodation of the lock rod 66 throughout the contemplated range of pivotal adjustment of the arm 88 on the opposed panel mounted pivot pins 90. As will be noted from FIGURE 3, the arm 88 is oriented below the top panel 62 with this top panel having a stop screw 94 threaded vertically therethrough so as to provide an adjustable abutment face 96 constituting the limit for the upward pivoting of the grinding wheel end of the arm 88. The lower pivotal limit of the grinding wheel end of the arm 88 is adjustably set by means of a second abutment or stop forming screw 98 threaded vertically through a forwardly projecting integral flange 100 on the block portion 58 immediately below the passage 64, both the screws 94 and 98 having suitable manipulating heads thereon with the lower screw 98 also having a positioning nut 102 threaded thereon which can be utilized to ensure a positive predetermined grinding depth for all of the teeth of an involved blade 104.

The forward end of the tool arm 88 is provided with a blind bore 106 within which a pivot pin 108 is fixed in forwardly projecting relation thereto. This pivot pin or member 108 in turn is rotatably received within the stem portion 110 of the grinding head 112. The grinding head 112 is secured on the pivot member 108 by a suitable lock ring 114 received over the reduced forward end of the member 108 which projects beyond the stem and into the grinding wheel housing or guard 116. The grinding head 112 is selectively locked in a rotatably adjusted position on the pivot member 108 by an enlarged headed lock screw 118 which acts, through a compression spring 120 and a bearing shoe 122 on the lower end thereof to maintain a constant locking pressure on the pivot member 108, the screw 118 itself being threaded within an internally threaded bore vertically through the grinding head stem 110 immediately above the received member 108.

The guard portion 116 of the grinding head 112 covers the upper half of the grinding wheel 56, both overlying the upper periphery of the wheel 56 and paralleling the opposed sides thereof in outwardly spaced relation thereto. The grinding wheel 56 is in turn rotatably mounted on one of the depending guard walls and has a suitable driven pulley unit 124 affixed to a common shaft therewith in a manner which allows for a belt driving of the grinder wheel from a remote motor unit 126 through a tensioned drive belt 128. As will be best appreciated from FIGURE 1, the grinding head guard 116 also includes a shield portion 130 overlying the bearing unit which mounts the wheel and driven pulley associated therewith. Inasmuch as the vertical pivoting of the tool arm 88 and grinding wheel 56 thereon is to be manipulated from a position forward of the machine, a suitable handle 132 is affixed to and projects upwardly and forwardly at an angle from the top of the grinding wheel guard 116.

The driving motor 126 is itself also mounted directly on the tool arm 88 to the rear of the tool post 54. This is effected through a plate-like mounting bracket 134 bolted directly to the motor and having a forwardly projecting cylindrical mounting member 136 received within a rearwardly directed blind bore 138 in the arm 88. The member 136, and hence the motor 126, is retained against rotation by means of a setscrew 140 threaded through the arm 88 and engaged within a longitudinal keyway 142 in the member 136. Further, in order to maintain a constant tension on the drive belt 128, an internal compression spring 144 is provided within the arm bore 138 in bearing engagement between the inner end of the bore 138 and the inner end of the motor mounting member 136 so as to constantly bias the motor 126 rearwardly. With reference to FIGURE 1, it will be noted that the drive shaft 146 of the motor 126 extends through a rearwardly directed portion of the mounting bracket 134 and mounts a drive pulley 148 on the outer portion thereof in front to rear alignment with the grinding wheel pulley 124. Mounted in this manner, it will be appreciated that the motor 26 will be automatically adjusted with the grinding head 112 and maintain an operative driving relationship with the grinding wheel 56 in any of the adjusted positions, a suitable switch 150 and power conductor 152 of course being associated with the motor 126 as illustrated in FIGURE 2.

Turning now specifically to the blade mount 52, such includes an elongated rigid support rod 154 having the upper end portion thereof slidably received within the adjusting slot 48 for an adjustable positioning therealong with the rod 154 depending vertically therebelow. A setscrew locked collar 156 is mounted on the rod 154 and locked in a position so as to engage the undersurface of the platform or plate 22 upon an upward drawing of the rod 154 through the driving of a screw 158 into a threaded bore provided in the upper end of the rod 154. A flat washer 160 underlies the head of the screw 158 so as to exert, in conjunction with the underlying collar 156, a clamping force on the sandwiched portion of the platform 22 for effectively locking the rod 154 in position. The non-circular cross-section of the rod 154 will of course preclude an undesirable rotation of the rod within the slot 48.

Figure 5:
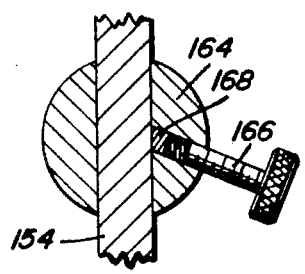
FIGURE 5 is an enlarged cross-section detail taken substantially on a plane passing along 5—5 in FIGURE 2.

The blade 104 to be sharpened is mounted for vertical adjustment along the rod 154 by means of a unit 162 which includes a collar-like mount 164 slidably received over the rod 154 and selectively locked thereto in a vertically adjusted position by an enlarged headed lock screw 166 threaded through the mount 164 and bearing against the rod 154 through a spring-urged shoe 168 as detailed in FIGURE 5. An enlarged back-up block 170 is affixed to the mount 164 and projects forwardly therefrom, the block 170 in turn having a concentric forwardly projecting threaded mounting shaft 172 rigidly affixed thereto in any suitable manner. A conical collar 174 is slidably mounted on the shaft 122 and urged rearwardly by an enlarged compression spring 176 selectively compressed by a hand manipulated nut 178 backed up by a jam or lock nut 180. The forward face of the block 170 will in most instances be relieved as at 182 so as to accommodate the truncated apex end of the cone 174 which in turn functions so as to properly center the blade 104 on the shaft 172 and simultaneously accommodate blades 104 having different size arbor openings therein. The blade mounting arm 154, because of the length thereof, will be able to accommodate blades of a wide range of different diameters through merely a longitudinal adjustment of the unit 162 therealong.

In order to provide for a rotational orientation of the blade 104 during the tooth sharpening operation, a tooth selector unit 184 is provided. This unit 184 includes a square or rectangular mounting block 186 received through the slot 48 for sliding adjustment therealong. The block 186 includes a vertically elongated front-to-rear slot or passage 188 therethrough for the accommodation of a cylindrical shaft 190 which in turn has a flat disk-like head or plate 192 rigidly affixed to the forward end of the shaft 190 and orientated beyond the forward edge of the platform 22. The shaft 190 is locked into a rotatably and slidably adjusted position within the slot 188 by means of a lock or set screw 194 threaded through the upper portion of the block 186 and into engagement with the top of the shaft 190 so as to clamp the shaft against the upper surface of the platform 22. The block itself is provided with a stop pin 196 projecting laterally therefrom and engaged with the undersurface of the platform 22 so as to limit the upward movement of the block 186 as the screw 194 is tightened against the shaft 190. The forward face of the disk or head 190 is provided with a pivotally mounted pawl 198 biased downwardly toward a position limited by a stop pin 200 through a resilient spring 202 and/or a suitable weight 204 affixed to the swinging end of the pawl 198 itself. As will be appreciated, the pawl 198 is so located as to allow a rotation of the blade 104 for the selective engagement of the teeth sequentially therebehind, the pawl moving against the biasing force of the spring 202 and weight 204 and subsequently returning into engagement with the stop pin 200 and preventing a reverse rotation of the blade 104. The entire tooth selector unit, through the engagement of the block 186 slidably in the slot 48 can be conveniently positioned to either side of the blade mounting rod 154 deemed most convenient in presenting the blade teeth to the grinding wheel 56. Incidently, the block 186 will be effectively clamped to the platform 22 against sliding movement through the slot 48 simultaneously with the rigid clamping of the shaft 190 due to the coaction between the upwardly drawn block pin 196 and the downwardly compressed shaft 190.

With reference to FIGURE 1, it will be noted that the side of the base 12 opposite from that with which the handle 36 is associated, is provided with a pair of upwardly projecting anvil-like members 206 and 208, the member 206 having a flat upper surface and being utilized as a "set-out" surface for the saw teeth, while the anvil-like unit 208 is provided with an appropriate inclined surface in conjunction with a superimposed setting tool 210 for introducing the desired set to the teeth of a blade 104. In order to properly position a blade 104 in relation to the members 206 and 208, it will be noted that the entire blade mounting unit, including the rod 154, is utilized with the blade 104 associated therewith in the same manner as in the grinding operation. In order to achieve this, the collar 156 on the rod or shaft 154 is provided with an enlarged hole 212 therein which receives an upwardly projecting stud 214 affixed to the base flange 18 immediately adjacent the anvil-like members 206 and 208, while the remote end of the rod or shaft 154 is provided with a laterally directed leg 216 which results in a substantially horizontal positioning of the rod 154 and hence the blade 104. In actual operation, one would normally remove the set of the teeth, effect the desired grinding thereof, and subsequently re-introduce the desired set, all of this being achieved with a single mounting of the particular blade 104 involved on the blade mounting unit including the rod or shaft 154.

From the foregoing, it will be appreciated that a unique saw blade sharpening apparatus has been defined, this apparatus being of a compact self-contained nature which enables its utilization, if desired, as a portable unit, easily moved from one location to another. In addition, the machine is capable of accommodating circular saw blades of a wide range of different diameters through the adjustable nature of all of the components of the machine, including the blade mount and the grinding wheel, the adjustable nature of the grinding wheel also enabling the introduction of any desired bevel to the teeth being sharpened or ground. The actual adjustability of the grinding wheel is effected through the utilization of a single tool post which is selectively positionable in any of a plurality of locations on a mounting platform through a selective movement of the post along an elongated branched slot defined in the mounting platform. By the same token, the grinding wheel itself is adjustably mounted on an elongated tool arm which is in turn adjustably mounted on the adjustable tool post, thus providing for what in effect amounts to a universal mounting of the grinding wheel itself along with the capability of locking the wheel in any adjusted position while at the same time retaining a driving engagement between the grinding wheel and the arm mounted motor provided in conjunction therewith.

A finial feature incorporated into the apparatus of the instant invention comprises means for effecting a dressing of the grinding wheel 56. This means consists of a suitably mounted diamond tool 218 mounted to one side of the tool post 54 on an integral projecting ledge 220. This diamond dressing tool 218 will normally be enclosed within a protective cap 222 as illustrated. In use, the plate 22 is oriented in its down or horizontal position, the knob 68 turned to release the tool post 54, and the tool post revolved so as to locate the grinding wheel 56 over the dressing tool 218. In this position, an integral rearwardly slotted flange 224 on the rear portion of the tool post 54 is engaged on the top of a positioning stud 226 adjacent the set-in and set-out tools and retained thereon by a screw 228 engaged through the slotted flange 224. After an orientation of the tool post 54 in this position, the knob 68 is turned into clamped position and then backed off approximately one half turn. The slot in the flange 224 will now allow a movement of the grinding wheel 56 over the dressing tool 222, which incidently will normally be angled 10° toward the tool post 54, thus allowing for a proper dressing of the grinding wheel 56 without removal of the grinding wheel 56 in an efficient manner utilizing the adjustable features of the apparatus to achieve the desired positioning of the wheel during the dressing operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool sharpening machine comprising a generally planar mounting platform, a vertical tool post projecting upwardly from said platform, means adjustably affixing said post to said platform for orientation in a plurality of adjusted positions, a tool arm mounted on said post and extending transversely therebeyond, a tool sharpening head mounted on one end of said tool arm outwardly of said post and vertically above one edge of said platform, means mounting said arm on said post for selective movement of the arm and the mounted sharpening head during a sharpening operation, and a tool mounting unit affixed to said platform adjacent said one edge in general alignment with the sharpening head for engagement of the head with a mounted tool.

2. The apparatus of claim 1 wherein said means adjustably affixing said post to said platform comprises an elongated slot defined through said platform, means depending from said post for guided movement within said slot, and means for selectively locking said post to said platform for rigid retention in an adjusted position.

3. The apparatus of claim 2 wherein the means depending from said post for guided movement within the slot comprises a nut-like member slidably and non-rotatably received in said slot for movement therealong, said means for selectively locking said post to said platform including an elongated bolt-like member rotatably retained in said post and depending therefrom through said nut-like member in threaded engagement therewith whereby rotation of said bolt-like member will effect a vertical adjustment of said nut-like member thereon, and abutment means associated with said nut-like member for limiting upward movement thereof on said bolt-like member by abutting engagement with the undersurface of said platform so as to effect a corresponding clamping of the platform between the superimposed post and the subjacent abutment means for locking the post to the platform.

4. The apparatus of claim 3 including a tool positioning unit mounted on said platform adjacent said one edge and the sharpening head, said tool positioning unit including a movably mounted biased pawl engageable with one or more selected portions of a tool to orientate the tool on the tool mounting unit for engagement of the sharpening head with selected portions of the tool.

5. The apparatus of claim 4 wherein said tool positioning unit further includes a plate-like member mounting the pawl for engagement with a tool, a rigid shaft affixed to the opposite side of the plate-like member from the pawl and projecting therefrom for adjustable reception in a mounting member on the platform, and means for locking the shaft, and hence the pawl, in any of a plurality of adjusted positions.

6. The apparatus of claim 5 including means for laterally adjusting the tool positioning unit along said platform relative to the sharpening head.

7. The apparatus of claim 6 including means for laterally adjusting the tool positioning unit along said platform relative to the sharpening head.

8. The apparatus of claim 7 including an elongated linear slot through said platform adjacent said one edge, said linear slot comprising a portion of the means for laterally adjusting the tool positioning unit and the means for laterally adjusting the tool mounting unit, said means for laterally adjusting the tool positioning unit further including a portion of said tool positioning member slidably and non-rotatably received in the linear slot, said means for laterally adjusting the tool mounting unit further including a portion of the tool mounting unit slidably and non-rotatably received in the linear slot.

9. The apparatus of claim 8 wherein said sharpening head includes a sharpening wheel rotatably mounted on said arm, motor means mounted on the second end of said arm for movement therewith, and means drivingly engaged between the motor means and the sharpening wheel.

10. The apparatus of claim 9 including a mounting base, means pivotally mounting said platform on said base, and means for maintaining the platform in at least two angularly adjusted positions relative to said base.

11. The apparatus of claim 9 wherein said tool mounting unit comprises an elongated rod, the upper end of said rod comprising the portion of the tool mounting unit received in the linear slot, a rod clamping member slidably mounted on the rod for slidable adjustment therealong and selective locked engagement therewith, and a tool clamping member affixed to the rod clamping member for adjustment therewith, said tool clamping member allowing a selected adjustment of the tool on said rod clamping member.

12. The apparatus of claim 9 including means adjustably mounting the sharpening head on said arm, and means providing adjustable abutments to limit the movement of said arm.

13. Saw blade sharpening apparatus comprising a mounting platform, a vertical tool post projecting upwardly from said platform, an elongated tool arm projecting perpendicularly across said tool post, means pivotally mounting said tool arm on said tool post for pivoted movement in a vertical plane within predetermined limits, a grinding wheel rotatably mounted on one end of said tool arm for movement therewith, said grinding wheel overlying one edge of said platform motor means mounted on the second end of said arm for movement therewith, drive means interconnecting said motor means and said grinding wheel, a blade mounting unit on said platform adjacent said one edge, and a blade positioning unit mounted on said platform adjacent said one edge, said blade positioning unit including tooth-engaging pawl means sequentially engageable with the teeth of a mounted saw blade to sequentially position the teeth for engagement by the grinding wheel upon a pivotal movement of the wheel mounting tool arm.

14. The apparatus of claim 13 wherein said blade mounting unit comprises a vertically elongated rod, means engaging the upper end of said rod for longitudinal adjustment along said one edge of the platform laterally of the grinding wheel, a rod clamping member longitudinally slidable on said rod for slidable adjustment therealong and selectively locked engagement therewith, and a tool clamping member affixed to said rod clamping member for adjustment therewith, said tool clamping member including means for selectively locking a saw blade thereto in any of a plurality of rotatably adjusted positions.

15. The apparatus of claim 13 including means mounting said post on said platform for adjustment about the central portion of said platform, said means including slot means defined through said platform, guide means affixed to said post and depending into said slot means for sliding movement therealong, and clamp means associated with said post for clamping said post to said platform in selected adjusted positions, and means mounting said grinding wheel on said arm for rotational adjustment about the longitudinal axis of said arm.

References Cited

UNITED STATES PATENTS

| | | | |
|---|---|---|---|
| 2,625,842 | 1/1953 | McEwan | 76—40 |
| 2,811,873 | 11/1957 | Nielsen | 76—40 |

BERNARD STICKNEY, Primary Examiner

U.S. Cl. X.R.

51—98